Figure 4:
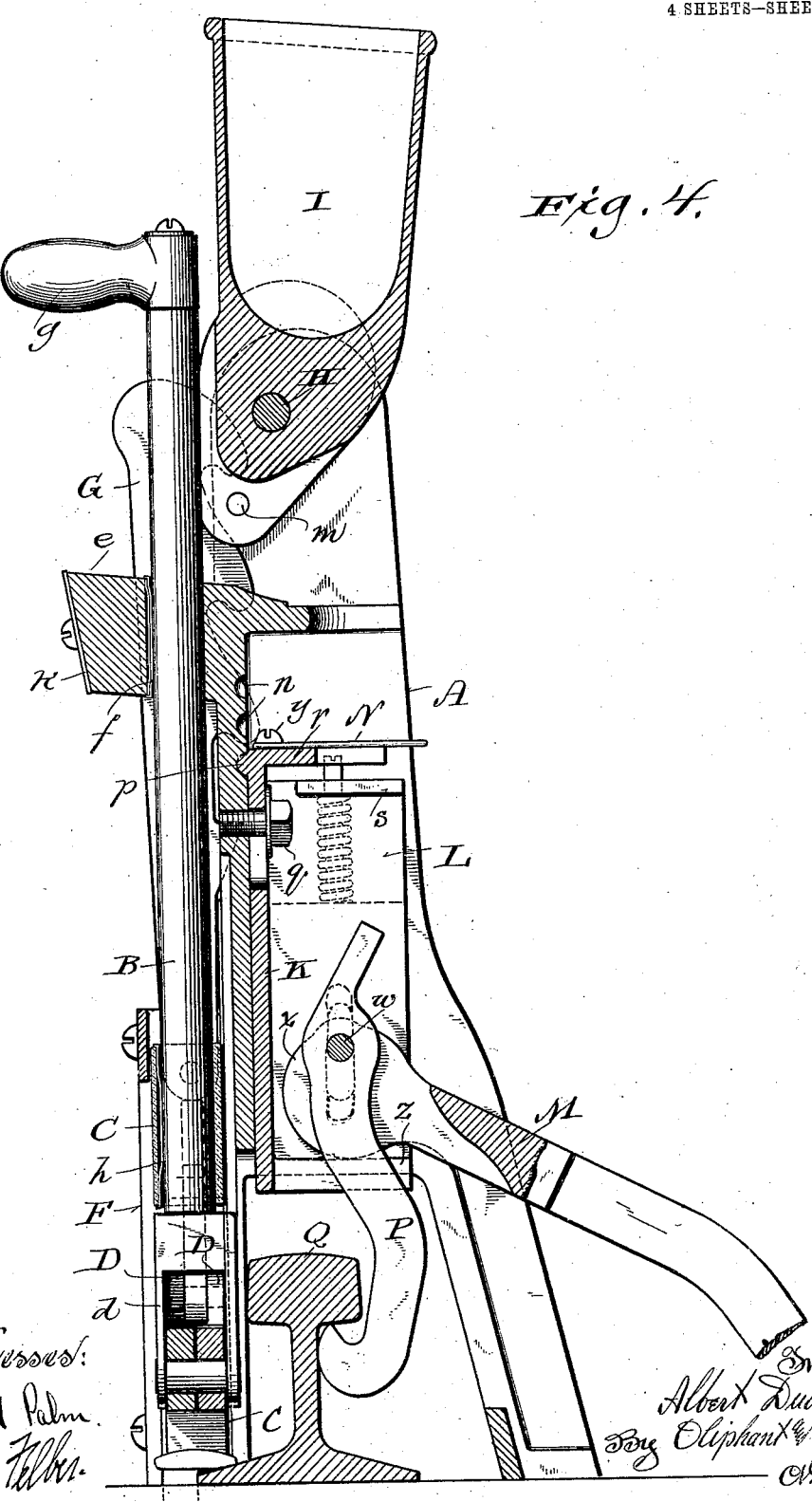

No. 842,185. PATENTED JAN. 29, 1907.
A. DUDLY, Sr.
SPIKE PULLER.
APPLICATION FILED MAY 7, 1906.
4 SHEETS—SHEET 1.
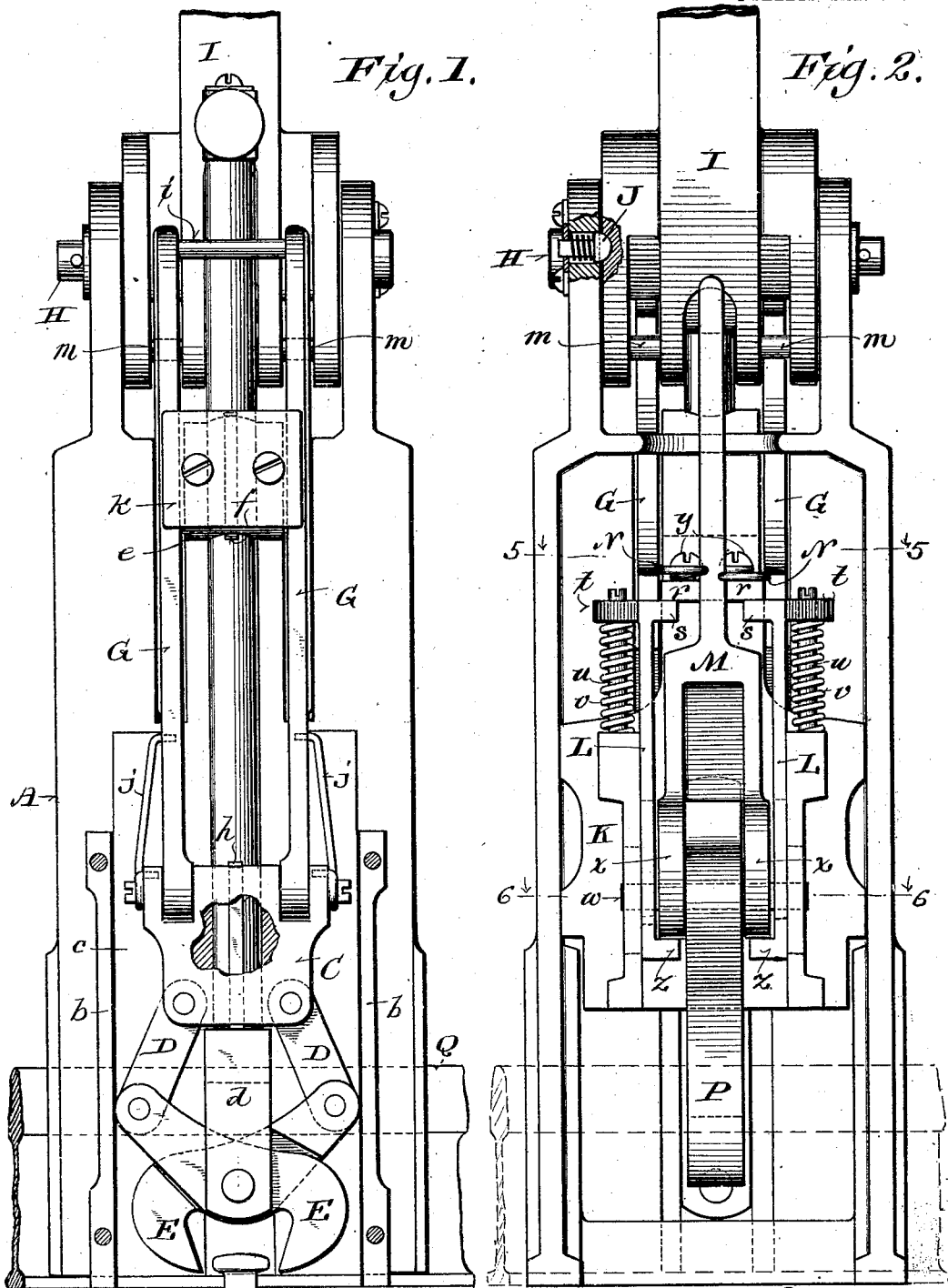

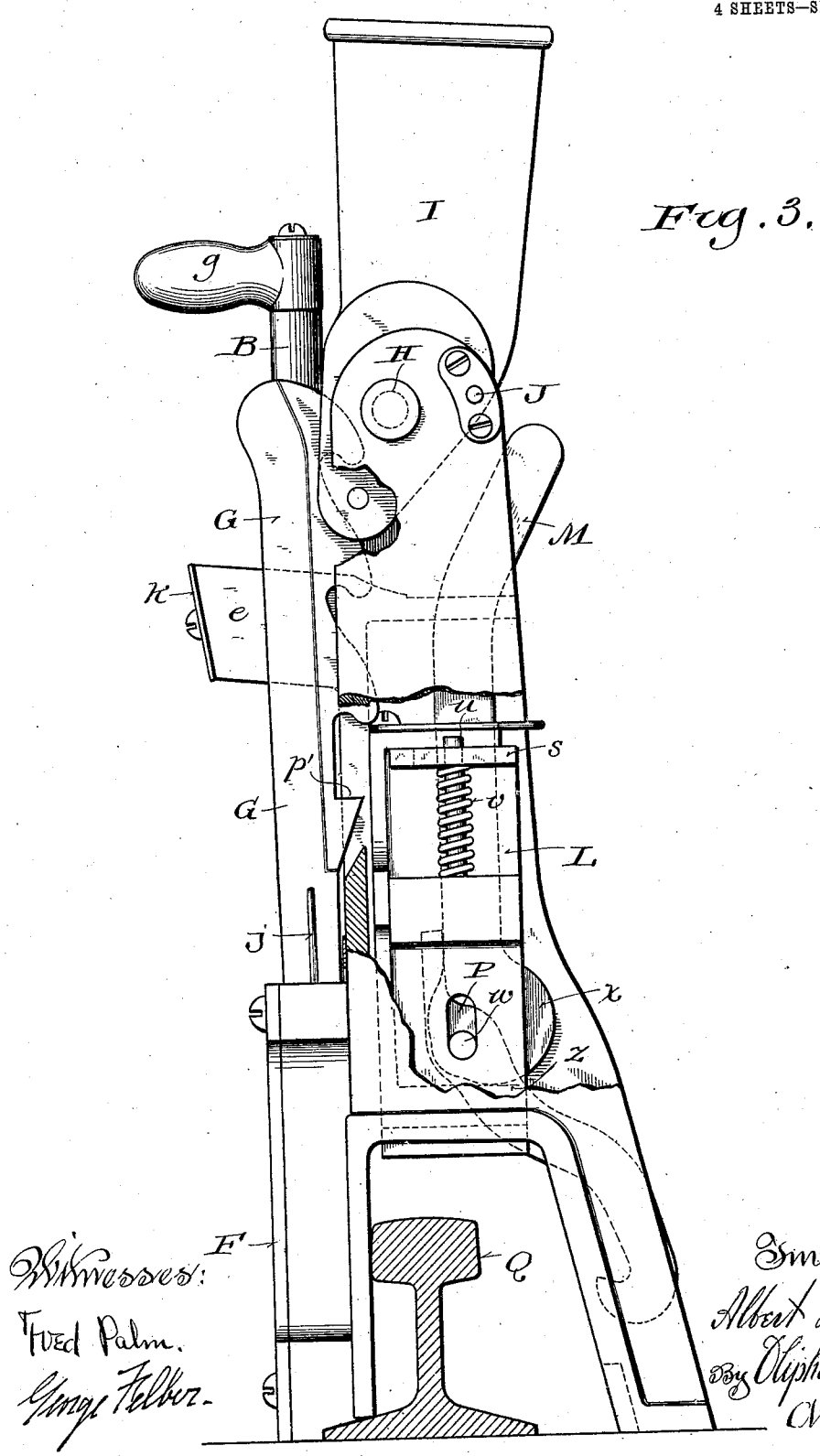

No. 842,185. PATENTED JAN. 29, 1907.
A. DUDLY, Sr.
SPIKE PULLER.
APPLICATION FILED MAY 7, 1906.

4 SHEETS—SHEET 3.

Witnesses:
Fred Palm
George Felber

Inventor:
Albert Dudly Sr.
By Oliphant & Young
Attorneys

No. 842,185.
PATENTED JAN. 29, 1907.
A. DUDLY, Sr.
SPIKE PULLER.
APPLICATION FILED MAY 7, 1906.
4 SHEETS—SHEET 4.
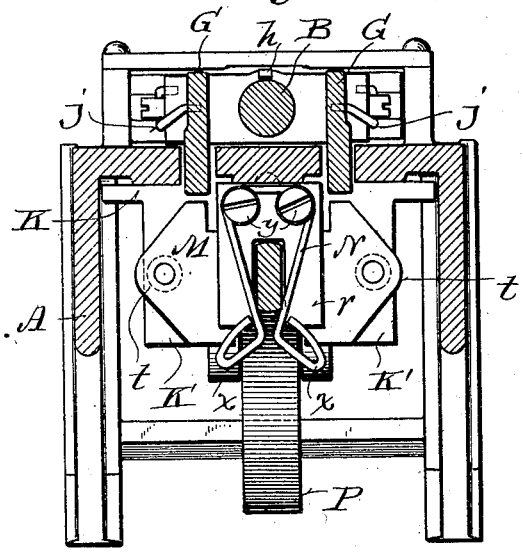
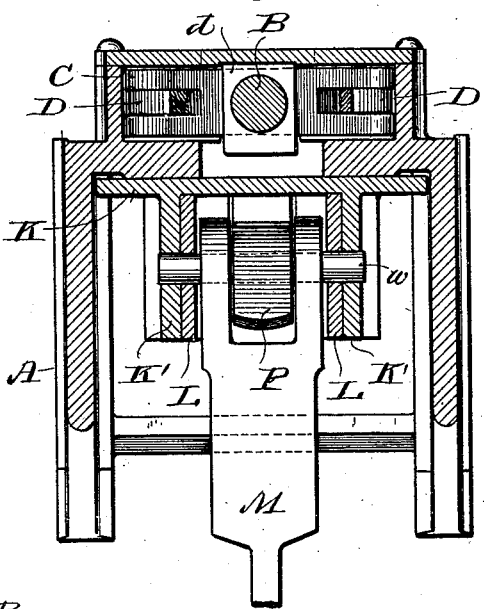
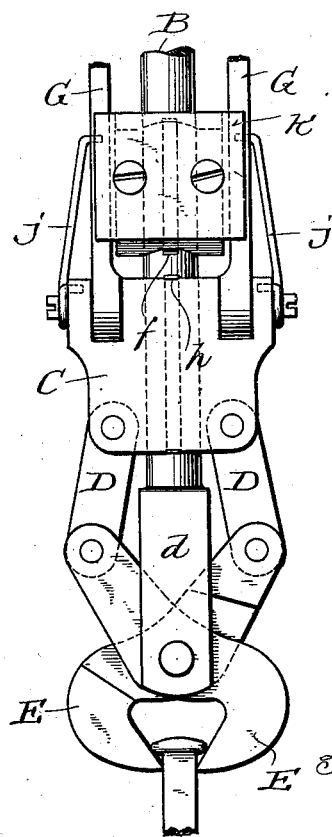

UNITED STATES PATENT OFFICE.

ALBERT DUDLY, SR., OF MENOMINEE, MICHIGAN, ASSIGNOR TO THE DUDLY TOOL COMPANY, OF MENOMINEE, MICHIGAN.

SPIKE-PULLER.

No. 842,185.  Specification of Letters Patent.  Patented Jan. 29, 1907.

Application filed May 7, 1906. Serial No. 315,494.

*To all whom it may concern:*

Be it known that I, ALBERT DUDLY, Sr., a citizen of the United States, and a resident of Menominee, in the county of Menominee and State of Michigan, have invented certain new and useful Improvements in Spike-Pullers; and I do hereby declare that the following is a full, clear, and exact description thereof.

My invention consists in certain peculiarities of construction and combination of parts herein shown, described, and claimed, its object being to provide simple, economical, compact, and efficient implements especially designed for extracting rail-securing spikes from cross-ties of a railway road-bed, said implements being of the least possible weight commensurate with the requisite strength and durability and which are operative to draw the spikes without bending the same.

Figure 1 of the accompanying drawings represents a front elevation of a spike-puller in accordance with my invention, partly broken away and having a shield-plate thereof detached, the jaws of the implement being open adjacent to a spike that is shown in the same view in conjunction with a fragment of a railway-track rail; Fig. 2, a rear elevation of the implement, partly broken away to show a latch-bolt for a lever-socket of same; Fig. 3, a side elevation of said implement, partly broken away; Fig. 4, a central section view of the implement; Figs. 5 and 6, horizontal section views, respectively, indicated by lines 5 5 and 6 6 in Fig. 2; and Fig. 7, a front elevation of a fragment of the implement having its jaws gripped on a spike and lifted therewith to the position at which they are automatically opened to release said spike.

Referring by letter to the drawings, A indicates the frame of the implement aforesaid, which frame is a suitably-designed single casting of suitable metal. Fastened to the frame by any means between lower vertical forward parallel flanges $b$ of the same is a wear-plate $c$, having a central vertical guide-slot for the lower forked end $d$ of a rod B in sliding engagement with a block $e$ of said frame against the resistance of a flat spring $f$ set in the block, and a handle $g$ is employed in connection with the upper end of the rod.

Fitting the rod B above the fork $d$ of same is a slide C, and a friction-spring $h$ is set in the slide against said rod, the resistance of this spring being less than that of the one, $f$, aforesaid. Links D connect the slide C with the crossed shanks of jaws E, these shanks being straddled by the fork $d$ of the rod C, to which they are pivotally connected, the opening of the jaws being limited by the contact of their shanks with the frame-flanges $b$, and to shield said jaws and parts in connection therewith a plate F is held by screws or other suitable means in connection with the frame-flanges.

In pivotal connection with the slide C are the lower ends of a pair of parallel racks G, connected at their upper ends by a rod $i$ or otherwise, these racks and their upper connection being hereinafter referred to as the "rack-yoke" of the implement. Springs $j$ connect the slide C and racks G, and outward swing of the racks against resistance of said springs is limited by a plate $k$, fastened by screws or other suitable means to the guide-block $e$ of the frame A to project therefrom in opposite directions in the path of said racks.

Supported on a pivot-pin H in the upper end of the frame A is an oscillative socket I for a hand-lever. (Not shown.) This socket is centrally recessed at its inner end to clear the rod B and provided with other recesses crossed by pins $m$, that engage with said racks. The lever-socket has one side thereof provided with an indenture for the engagement of an automatically-retractive catch-bolt J, provided in a side of the frame aforesaid.

The back of the frame A is shown provided with a central row of depressions or sockets $n$, either one of which is engaged by a lug $p$ of a centrally-slotted plate K, according to the adjustment of said plate. The plate is held in its adjusted position by a set-screw $q$ extending through the slot of same into the aforesaid frame, a washer being interposed between the head of the screw and said plate. This plate K is provided with parallel rear vertical flanges K′, that are longitudinally slotted, and parallel to these flanges are similarly-slotted plates L, inwardly flanged at their upper and lower ends. A horizontal rear upper centrally-recessed flange $r$ of the plate K is in the upward path of the upper inner flanges $s$ of the plates L, and upper outer horizontal ears $t$ of these plates L are guided on screw-pins $u$, that engage the flanges K′ of the former plate. Surrounding the pins $u$ under tension are spiral springs v between the flanges K' of the plate K and the ears t of the plates L aforesaid.

Engaging registering vertical slots in the plate-flanges K' and the plates L is a pin w, that serves as a pivot for cam ends x of the branches of a forked lever M, that has its play between said plates L and may be swung up into engagement with the recess of the flange r of the plate K, where it is caught between the jaw ends of a suitably-bent wire spring N, the coils of which spring are engaged by screws y, engaging said flange. The cam ends of the fork branches of the lever M bear on the inner lower flanges z of the plates L, and by means of said lever said plates are moved downward against resistance of the springs v aforesaid. When the lever is swung up into engagement with the recess of the plate-flange r and the jaw ends of the spring N, it is in position to be dislodged by the lever-socket I when the latter is swung down in case the operator of the implement neglects to pull said lever clear of said plate-flange and the spring-jaws.

Hung on the pivot-pin w in the fork of the lever M is a swing-hook P, the upper end of which is in the path of said lever when the same is swung upward to be caught and held under the lever-socket aforesaid. The lever M being swung down, the hook P has automatic swing to be caught under the tread of a track-rail Q when the implement is in position to pull a spike, and by full downward throw of said lever said hook is caused to grip the rail, and thereby anchor said implement astraddle of the same, there being upward draw of the aforesaid hook against resistance of the springs v, above specified.

The aforesaid plate K is adjustable vertically of the frame of the implement in order that said implement may be utilized in conjunction with track-rails of varying height. Otherwise this plate may be omitted and the flanges K' provided on the back of said frame.

In practice the implement is anchored, as aforesaid, and the rack-yoke thereof swung outward to clear the pins m of the lever-socket, thereby permitting the pushing down of the rod B and said yoke to bring the jaws E in position to grip a spike. In case the jaws have not been previously spread sufficiently far apart their contact with the head of the spike will result in a slip of the rod B in the slide C to effect the necessary spreading of said jaws. The yoke-rack having been allowed to swing back to normal position, the swinging down of the lever-socket I will result in a draw of the slide C to cause a grip of the jaws E on the spike under the head of same and thereafter a lift of said slide and rod to start said spike. By continued operations of the lever-socket in conjunction with the rack-yoke the spike is pulled clear of a cross-tie, and said yoke having been lifted the full limit the next upward lift of said lever-socket will result in each pin m of same coming into contact with a horizontal tooth p' of a rack G to depress said yoke and the slide C therewith, thereby causing a spreading of the jaws E to release said spike that has been easily pulled without bending.

From the foregoing it will be understood that the spring f holds the rod B and parts in connection therewith in step-by-step vertically-adjusted position when a spike is being pulled, and the weaker spring h is virtually a yielding friction-grip between the slide C and said rod.

I claim—

1. A spike-puller comprising a suitable frame, a rod having sliding connection with the frame, a spring arranged to hold the rod in any position of vertical adjustment, a slide on the rod, a spring of less strength than the one aforesaid arranged to hold the slide in adjusted position with respect to said rod, jaws in pivotal connection with the aforesaid rod and having crossed shanks in link connection with the slide, a rack-yoke in pivotal spring-controlled connection with said slide, and an oscillative lever-socket engageable with said yoke to impart step-by-step lift to same with the slide and rod as well as independent downward movement to the slide subsequent to the last lift, the initial lift of the slide serving to close the jaws and its independent downward movement to open the same.

2. A spike-puller comprising a suitable frame, a rod having sliding connection with the frame, a spring arranged to hold the rod in any position of vertical adjustment, a slide on the rod, a spring of less strength than the one aforesaid arranged to hold the slide in adjusted position with respect to said rod, jaws in pivotal connection with the aforesaid rod and having crossed shanks in link connection with the slide, a rack-yoke in pivotal spring-controlled connection with said slide, an oscillative lever-socket engageable with said yoke to impart step-by-step lift of the same with the rod and a downward movement thereto subsequent to the last lift, an anchor-hook in swing suspension, and means for gripping the hook in connection with a track-rail against yielding resistance.

3. A spike-puller comprising a suitable frame, a rod having sliding connection with the frame, a spring arranged to hold the rod in any position of vertical adjustment, a slide on the rod, a spring of less strength than the one aforesaid arranged to hold the slide in adjusted position with respect to said rod, jaws in pivotal connection with the aforesaid rod and having crossed shanks in link connection with the slide, a rack-yoke in pivotal spring-controlled connection with said slide, an oscillative lever-socket engageable with said yoke to impart step-by-step lift of the same with the rod and a downward movement thereto subsequent to the last lift, a vertically-adjustable plate having longitudinally-slotted vertical flanges, spring-controlled slide-plates parallel to the vertical flanges of the former plate and provided with corresponding slots, an anchor-hook suspended on a pin engaging the slots of said plate-flanges and slide-plates, and a cam-lever on said pin in opposition to flanges of the aforesaid slide-plates against resistance of the springs controlling same.

4. A spike-puller comprising a suitable frame, a rod having sliding connection with the frame, a spring arranged to hold the rod in any position of vertical adjustment, a slide on the rod, a spring of less strength than the one aforesaid arranged to hold the slide in adjusted position with respect to said rod, jaws in pivotal connection with the aforesaid rod and having crossed shanks in link connection with the slide, a rack-yoke in pivotal spring-controlled connection with the slide, an oscillative lever-socket engageable with said yoke to impart step-by-step lift of the same with the rod and a downward movement thereto subsequent to the last lift, a vertically-adjustable plate having an upper horizontal recessed flange and longitudinally-slotted vertical flanges, spring-controlled slide-plates parallel to the vertical flanges of the former plate and provided with corresponding slots, spring-jaws on the horizontal flange of said adjustable plate, an anchor-hook suspended on a pin engaging the slots of said plate-flanges, and a cam-lever on said pin in opposition to flanges of the aforesaid slide-plates against resistance of the springs controlling same, said lever being adjustable to engage the recessed flange and spring-jaws aforesaid under the elevated lever-socket and against the shank of said hook to swing and hold the latter out of working position.

5. A spike-puller comprising a suitable frame, a rod in friction-grip connection with the frame, a slide in similar connection with the rod, the friction on the rod being stronger than that on the slide whereby the two are at times movable together, the slide being at other times movable independent of the rod; jaws in pivotal connection with the rod and in link connection with the slide, and a rack-and-lever mechanism for lifting the rod, slide, jaws and a gripped spike, as well as for imparting independent movement to the slide to effect release of the spike.

6. A spike-puller comprising a suitable frame, a rod in friction-grip connection with the frame, a slide in similar connection with the rod, the friction on the rod being stronger than that on the slide whereby the two are at times movable together, the slide being at other times movable independent of the rod; jaws in pivotal connection with the rod and in link connection with the slide, a rack-and-lever mechanism for lifting the rod, slide, jaws and a gripped spike, as well as for imparting independent movement to the slide to effect release of the spike, a pivotally-hung anchor-hook, and means for gripping the hook in connection with a track-rail against yielding resistance.

7. A spike-puller comprising a suitable frame, a rod in friction-grip connection with the frame, a slide in similar connection with the rod, the friction on the rod being stronger than that on the slide whereby the two are at times movable together, the slide being at other times movable independent of the rod; jaws in pivotal connection with the rod and in link connection with the slide, a rack-and-lever mechanism for lifting the rod, slide, jaws and a gripped spike, as well as for imparting independent movement to the slide to effect release of the spike, a pivotally-hung vertically-adjustable anchor-hook, and means for gripping the hook in connection with a track-rail against yielding resistance.

8. A spike-puller comprising a suitable frame, a rod in friction-grip connection with the frame, a slide in similar connection with the rod, the friction on the rod being stronger than that on the slide whereby the two are at times movable together, the slide being at other times movable independent of the rod; jaws in pivotal connection with the rod and in link connection with the slide, a rack-and-lever mechanism for lifting the rod, slide, jaws and a gripped spike, as well as for imparting independent movement to the slide to effect release of the spike, and a catch-bolt for holding the lever of said mechanism in lifted position.

9. A spike-puller comprising a suitable frame, a rod in friction-grip connection with the frame, a slide in similar connection with the rod, the friction on the rod being stronger than that on the slide whereby the two are at times movable together, the slide being at other times movable independent of the rod; jaws in pivotal connection with the rod and in link connection with the slide, a rack-and-lever mechanism for lifting the rod, slide, jaws and a gripped spike, as well as for imparting independent movement to the slide to effect release of the spike, a catch-bolt for holding the lever of said mechanism in lifted position, and a pivotally-hung lever-controlled anchor-hook, a yielding resistance to throw off the hook-controlling lever in one direction, and means for clutching said hook-controlling lever at full throw of same in the opposite direction under the former lever.

In testimony that I claim the foregoing I have hereunto set my hand, at Menominee, in the county of Menominee and State of Michigan, in the presence of two witnesses.

ALBERT DUDLY, Sr.

Witnesses:
HOLSEY B. MOULTON,
BYRON H. STEBBINS.